United States Patent [19]

Jarrold et al.

[11] Patent Number: 5,702,766
[45] Date of Patent: Dec. 30, 1997

[54] PROCESS OF FORMING A CERAMIC ARTICLE CONTAINING A CORE COMPRISING ZIRCONIA AND A SHELL COMPRISING ZIRCONIUM BORIDE

[75] Inventors: Gregory S. Jarrold, Henrietta; Dilip K. Chatterjee; Syamal K. Ghosh, both of Rochester, all of N.Y.

[73] Assignee: Eastman Kodak Company, Rochester, N.Y.

[21] Appl. No.: 770,447

[22] Filed: Dec. 20, 1996

[51] Int. Cl.[6] .................... B05D 3/00; C04B 35/488
[52] U.S. Cl. .................. 427/376.1; 427/58; 427/377; 501/103; 501/104; 501/105; 501/87; 501/96.1; 252/520
[58] Field of Search ................ 501/96, 98, 103, 501/104, 105, 96.1, 87; 252/520; 427/58, 376.1, 376.2, 377

[56] References Cited

U.S. PATENT DOCUMENTS

| | | | |
|---|---|---|---|
| 4,528,121 | 7/1985 | Matsushita et al. | 252/516 |
| 4,751,207 | 6/1988 | Manning | 501/104 |
| 4,820,667 | 4/1989 | Tsunekawa et al. | 501/104 |
| 5,045,512 | 9/1991 | Lange et al. | 501/96 |
| 5,177,037 | 1/1993 | Schuldies | 51/309 |
| 5,183,610 | 2/1993 | Brog et al. | 264/56 |
| 5,230,718 | 7/1993 | Oki et al. | 41/293 |
| 5,290,332 | 3/1994 | Chatterjee et al. | 65/18.1 |
| 5,336,282 | 8/1994 | Ghosh et al. | 51/309 |
| 5,358,913 | 10/1994 | Chatterjee et al. | 501/103 |
| 5,411,690 | 5/1995 | Ghosh et al. | 264/63 |
| 5,525,560 | 6/1996 | Yamazaki et al. | 501/103 |

FOREIGN PATENT DOCUMENTS

| | | |
|---|---|---|
| 83102881 | 6/1983 | Japan . |
| 59-227771 | 12/1984 | Japan . |

*Primary Examiner*—Mark L. Bell
*Assistant Examiner*—Louis M. Troilo
*Attorney, Agent, or Firm*—Arthur H. Rosenstein

[57] ABSTRACT

A method for preparing a ceramic composite having a core/bulk of tetragonal zirconia alloy and a shell/surface comprising zirconium boride by sintering a zirconia or zirconia and alumina composite article in an argon atmosphere while in contact with boron carbide.

26 Claims, 5 Drawing Sheets

PROCESS OF FORMING A CERAMIC ARTICLE CONTAINING A CORE COMPRISING ZIRCONIA AND A SHELL COMPRISING ZIRCONIUM BORIDE

FIELD OF THE INVENTION

This pertains to methods for preparing ceramic items, and more particularly to methods of preparing ceramic articles having a core consisting essentially of tetragonal zirconia said core being electrically insulating whose surface layers are primarily zirconium boride which is electrically conductive for use as tools, integrated capacitors as low friction surface.

BACKGROUND OF THE INVENTION

In the production of materials such as photographic films and papers; cutting tools, such as perforators and slitter knives, require impact resistance to eliminate catastrophic failures, and corrosion, wear and abrasion resistance to improve service life and productivity. Conventional cutting tool materials, such as high speed steels, hardenable stainless steels, and cemented tungsten carbides, meet some of these requirements but have considerable limitations to warrant improved service life. Conventional cutting tool materials also have the limitation of requiring frequent maintenance due to wear, abrasion and corrosion.

Ceramic zirconia materials such as tetragonal zirconia polycrystal (TZP) and yttria-doped tetragonal zirconia polycrystal (Y-TZP) ceramic materials and composites of zirconia and alumina offer many advantages over conventional materials and are therefore used in cutting, perforating, slitting and chopping of photographic film and paper webs. Y-TZP is one of the toughest ceramics. The toughness is achieved at the expense of hardness and or strength. Tetragonal zirconia alloy, the product of sintering a particulate mixture of zirconia and some stabilizing dopants is a tough and relatively soft structural material but has many attractive properties such as high fracture toughness and corrosion resistance. However, tetragonal zirconia alloy has tribological properties that are not as attractive as other high performance structural ceramics like SiC and $Si_3N_4$. Examples of materials having good hardness and strength is monolithic cubic spinel, SiC and $Si_3N_4$ however, these materials have unusually high brittleness and are unusable for structural applications, particularly for cutting tool applications.

It is known that impact beating tools or parts have a longer service life and better performance if made with a core/balk of a tough material and a surface or shell of a hard material. Common examples for metallic materials include nitrided or case carburized metal tool parts, camshafts and the like. A surface treatment such as carburizing or nitriding is used to form a stable hard phase over a tougher core. The phase changes are dependent upon the reactivity of the parent metallic material with a reacting material, for example, a carbon or nitrogen species. In ceramics, inherent chemical inertness has impeded the preparation of comparable composite structures. Tetragonal zirconia ceramic articles having surface areas with stress induced phase changes are very easy to achieve, since such phase changes occur as a result of abrasion on working surfaces during use. With Y-TZP, stress induces transformation from a tough, but not very hard tetragonal phase to a harder monoclinic phase. This phase change can be utilized in different ways. Net shape tetragonal zirconia alloy articles can be produced as disclosed in U.S. Pat. No. 5,290,332. The term "net shape" is defined as a ceramic article that is dimensionally true after sintering and therefore does not necessitate further machining prior to use in its intended working environment. During use, working surfaces of a net shape article will be subject to phase transformation due to its wear and abrasion. Suitable tolerances will permit abrasion losses at working surfaces, prior to phase transformation, to be ignored. Alternatively, surface phase transformation of tetragonal zirconia to monoclinic zirconia can be induced by an abrading process, such as grinding or lapping, during fabrication of the tool. Neither approaches are straight-forward in that two variables, the dimensions of the article and its phase characteristics are changing simultaneously. Both approaches are extremely problematic when attempted with an article having a complex geometry.

An alternative approach is taught by U.S. Pat. No. 5,358,913; which is hereby incorporated herein by reference. In that approach, a tetragonal zirconia alloy article, which can be near net shape, is compacted and then sintered in the presence of MgO, CaO, $Y_2O_3$, $Sc_2O_3$, $CeO_2$, or rare earth oxide dopants and combinations thereof to produce an article having a tetragonal core and a cubic phase shell. The dopant can be provided in a number of different forms such as a solid plate, a powder, or a layer produced by decomposition of an organo-metallic precursor film. In U.S. patent application Ser. No. 07/994,820 now abandoned in favor of Continuation-in-Part application Ser. No. 08/231,870, filed Apr. 25, 1994 and Divisional application Ser. No. 08/506,629 filed 25 Jul. 1995; a method is described for producing articles having a tetragonal zirconia alloy core and a monoclinic shell by diffusion control. In U.S. patent application Ser. No. 07/994,818 now abandoned in favor of a Continuation-in-Part application Ser. No. 08/400,416, filed 03 Mar. 1995, which is hereby incorporated herein by reference; a method is described for producing articles having a tetragonal zirconia alloy and alumina core and a shell of tetragonal zirconia and cubic spinel. In the core and the shell the predominant species is tetragonal zirconia. The application also teaches a method for producing articles having a core that is tetragonal zirconia alloy along with less than about 5 weight percent alumina and having a shell that is cubic phase zirconia and cubic spinel.

In U.S. Pat. No. 5,177,037 an electro-discharge machinable ceramic containing at least one non-electroconductive and one electroconductive ceramic whisker component is used. This patent does not describe tetragonal zirconia materials.

In Japanese Patent 83102881, stabilized zirconia of 94 to 88 mole percent blended with 6 to 12 mole percent stabilizer of MgO, CaO, $Y_2O_3$, and $CeO_2$ is described as being prepared from a mixture of stabilized zirconia and zirconium diboride by hot processing or sintering under ordinary pressure at temperatures above 1400° C. This amount of stabilizer results in a multiphase zirconia.

In U.S. Pat. No. 5,230,718, abrasive grains are coated with a substance selected from carbides, borides and nitrides of a metal by immersion in a molten salt bath. This results in formation of a boron compound layer on the surface of said abrasive grain. However, a prerequisite is that the abrasive particles have a metal coating.

In cutting, perforating, or slitting of multilayered webs such as photographic films and paper, one encounters the problem of debris generated during the operations. Smart tool design can alleviate this problem to some extent. However, the electrostatic charges accumulated on the tool surfaces can attract the debris. This problem can be reduced, if not eliminated, provided the tool surface can dissipate the electrical charge generated due to friction between the tool and the work surface.

One of the biggest drawbacks of zirconia alloys such as TZP and Y-TZP and composites based on zirconia and alumina tool materials is that they are highly electrically insulating at room temperature and therefore are unsuitable for use as a tool for finishing operations which are normally carried out at room temperature and actually generate debris. These operations are unsuitable because the product quality is unacceptable, because it is dirty due to debris attraction by the tool, because it is non-conductive and because it accumulates electro-static charges. Many attempts have been made by others to make zirconia alloy such as TZP and its composites electrically conductive but at the expense of degradation of its mechanical properties, especially its fracture toughness. It is an object of the invention to induce surface electrical conductivity on TZP, Y-TZP and Y-TZP and alumina composite materials without jeopardizing its mechanical properties significantly so that cost-effective finishing operations of multi-layered webs can be performed and product rejection due the debris is minimized/eliminated. Another part of this invention deals with the preparation of a ceramic article with surface electrical conductivity in an effective way so that the secondary steps are avoided by carrying out in-situ surface modification during the sintering operation of the ceramics.

SUMMARY OF THE INVENTION

This invention relates to in-situ or secondary surface modification of zirconia such as TZP, Y-TZP or a Y-TZP and $Al_2O_3$ matrix composite with boron carbide ($B_4C$), as accomplished during sintering in an argon environment, yielding a surface which is highly electrically conductive; whereas, the bulk remains insulating. This relates to diffusion controlled exchange reactions during sintering at 1200° to 1600° C. in which at least the surface is converted to electrically conductive zirconium boride ($ZrB_2$) as verified by x-ray diffraction. A functionally gradient material with varying $ZrB_2$ concentration from one end to the other can be made depending on the mount of $B_4C$ present, as well as by controlling sintering temperature and sintering time. The bulk crystal structure is primarily tetragonal zirconia with a minor (trace) amount of monoclinic phase being present.

The resulting ceramic article contains a core or bulk comprising predominately tetragonal zirconia and a shell or surface comprising predominately zirconium boride.

The modified zirconia tool has a surface electrical conductivity which minimizes accumulation of turbo-electric charge in a process where polymeric materials come in contact with conveyance apparatus such as rollers or guide rails manufactured from such materials for transporting photographic film or papers. As this process allows for functionally gradient modification, meaning more depth of the core can be modified to be electrically conductive, it is possible to cost effectively machine these articles using the electro-discharge machining (EDM) process. Articles such as integrated capacitors can be made using these functionally gradient materials.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein.

DETAILED DESCRIPTION OF THE PREFERRED EMBODIMENTS

In the method of the invention, sintered and/or "green" zirconia alloy ceramic materials are dip coated in a boron carbide slurry and sintered. The sintering is performed in an atmosphere of argon gas. The resulting ceramic article of the invention has a shell or surface of essentially zirconium boride and a core or bulk of essentially tetragonal zirconia.

The chemical reaction which is thought to be responsible for the formation of the shell of the composite is $2ZrO_2 + B_4C \rightarrow 2ZrB_2 + CO_2 + O_2$ wherein the boron carbide reacts with the zirconium oxide to form zirconium boride.

The methods of the invention utilize particulate alloys of tetragonal zirconia made from a chemical mixture of pure $ZrO_2$ and an additional "secondary oxide" selected from: MgO, CaO, $Y_2O_3$, $Sc_2O_3$ and $CeO_2$ and other rare earth oxides (also referred to herein as "Mg-Ca-Y-Sc-rare earth oxides"). Zirconia alloys useful in the methods of the invention have a metastable tetragonal crystal structure in the temperature and pressure ranges at which the ceramic article produced will be used. Preferred oxides for alloying with zirconia are $Y_2O_3$, MgO, CaO, $CeO_2$, $Sc_2O_3$, and rare earth oxides and combinations of these oxides. It is preferred that the zirconia powders are of high purity, greater than about 99.9 percent. Specific examples of useful zirconia alloys include: tetragonal structure zirconia alloys having from about 0.5 to about 5 mole percent and preferably about 2 to about 5 mole percent $Y_2O_3$, or more preferably about 3 mole percent $Y_2O_3$. In the case of MgO, 0.1 to 1.0 mole percent to produce a tetragonal structure and for $CeO_2$, 0.5 to 15 mole percent to produce a tetragonal structure, CaO of 0.5 to about 5 mole percent to produce a tetragonal structure and $Sc_2O_3$ at about 0.5 mole percent to 7.0 mole percent to produce a tetragonal structure. Examples of tetragonal structure zirconia alloys useful in the methods of the invention are disclosed in U.S. Pat. Nos. 5,290,332 and 5,411,690. Such zirconia alloys are described in those patents as being useful to provide a "net shape" ceramic article: a ceramic article that is dimensionally true after sintering and therefore does not necessitate further machining prior to use in its intended working environment.

Figure 1:
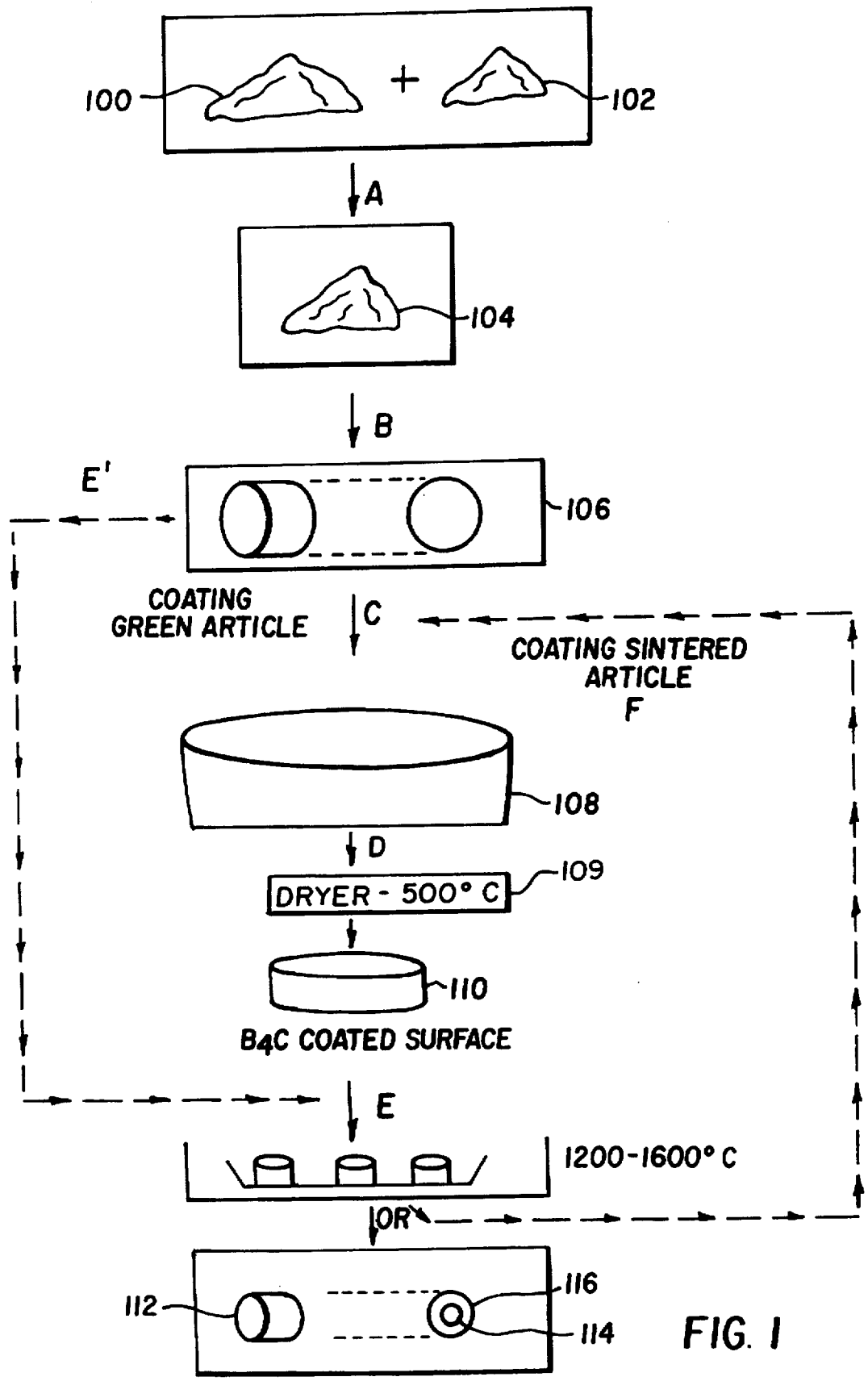
FIG. 1 is a schematic diagram of the method of the invention.

Step "A" in FIG. 1, diagrammatically illustrates the alloying process. Zirconia powder 100 is combined with one or more secondary oxide powders 102 to provide zirconia alloy powder 104. The preparation of zirconia alloys is well known to those skilled in the art and zirconia alloys are available commercially. For example, particulate zirconia alloy having 3 mole percent $Y_2O_3$ is marketed by Z-TECH Corporation, Bow, N.H. (presently known as HANWHA Advanced Ceramics), as "SYP-ULTRA 5.2" or "HWA-3YB" Yttria Stabilized Zirconia and TOSHO Corporation of Japan as "TZ-3YB ."

The grain and agglomeration sizes and distributions, moisture contents, and binders (if any) can be varied in the zirconia alloy, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains.

An example of convenient particulate characteristics for a particular embodiment of the invention is the following. Purity is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is 40–60 micrometers. Moisture content is about 0.2 to 1.0 percent by volume of blank and is preferably 0.5 percent. The mixture of particulates is compacted in the presence of a binder such as gelatin, PEG, acrylic, or polyvinyl ionomer or more preferably polyvinyl alcohol. The binder is added to and mixed in with the particulate mixture, for example by spraying or ball milling prior to placement of the powder mixture in a compacting device.

Referring to FIG. 1, the zirconia alloy 104 is compacted as represented by step "B" to form a "green" body 106 or 106 can be an already sintered part. This body is coated with a boron carbide slurry as shown in step "C". The boron carbide is dispersed in a solvent such as paraffin oil. The coating of the "green" or sintered bodies is done by a process such as dip coating, spin coating, spray coating, doctor blading, casting or a combination thereof.

The coated green body is then dried or debound as shown in step "D" using dryer 109 as shown in FIG. 1 and then are sintered/reacted at temperatures in the range of 1200°–1600° C. in an argon atmosphere as shown in step "E".

In this invention the reaction between $B_4C$ and $ZrO_2$ to form $ZrB_2$ can be achieved in a number of ways. The green bodies needs simply to be in contact with the $B_4C$.

Also, any sintered tetragonal $ZrO_2$ alloyed article (formed in step "E") can be coated with $B_4C$ as indicated in step "F" to produce a $ZrB_2$ shell/surface. The interface between the tetragonal $ZrO_2$ core/bulk and the $ZrB_2$ shell/surface is not discreet but is gradual. In a diffusion controlled process, such as that in this invention, $B_4C$ is diffusing from the $ZrO_2$ shell/surface to effect a reaction between tetragonal $ZrO_2$ and $B_4C$ to form $ZrB_2$. It is expected that the $ZrB_2$ concentration will gradually decrease from the shell/surface of the article to the core/bulk. By controlling time and temperature, the concentration and depth of zirconium boride is controlled. Concentration of zirconium boride formation controls electrical conductivity.

The fully sintered and/or interim product of partial compacting and partial sintering operations is referred to herein as a "blank", which is illustrated as element (blank) 112 in FIG. 1. Blank 112 is compacted and is fully sintered or hot isostatically pressed 112.

Completion of compacting and sintering provides the finished ceramic article 112, which has a core or bulk 114 substantially composed of tetragonal zirconia and a shell or surface 116 substantially composed of zirconium boride.

In a preferred method of the invention, the powder is cold compacted to provide a "green preform", which has a "green" density that is substantially less than the final sintered density of the ceramic article 112. The final sintered density of the shell or the surface 116 differs slightly from the final sintered density of the core 114, however, except for very small articles 112, this difference can be ignored and final sintered density can be considered to equal the density of the core or bulk after sintering. It is preferred that the green density be between about 40 and about 65 percent of the final sintered density, or more preferably be about 60 percent of the final sintered density.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 psi (100 MPa), the compaction time can be 30 seconds. It is well known that the compaction pressure and time selected by the operator will influence the size of the finished part 112. Generally, as the part size increases, compaction time is increased.

The methods of the invention are not limited to a particular sintering pressure and temperature conditions. Sintering can be performed at atmospheric pressure or alternatively a higher pressure can be used during all or part of the sintering to reduce porosity. The sintering is continued for a sufficient time period for the article being sintered to reach a thermodynamic equilibrium structure. An example of a useful range of elevated sintering pressures is from about 69 MPa to about 207 MPa, or more preferably about 100–103 MPa. An example of a useful range of sintering temperatures is from about 1200° to about 1600° C., or more preferably about 1500° C. An example of a useful range of sintering times is from about 1 hour to about 3 hours or more preferably about 2 hours. In a particular embodiment of the methods of the invention, the sintering peak temperature is 1500° C. and that temperature is maintained for about 2 hours. The thickness of the functionally gradient conductive layer can be varied by varying the sintering temperature and/or time. The compacting and sintering processes can be done simultaneously, if desired.

It is preferred that the sintered blank be slowly heated to sintering temperature and slowly cooled so as to avoid undesirable dimensional changes leading to crack development in the ceramic articles. In an embodiment of the invention having a preferred sintering temperature of 1500° C., preferred temperature ramps during heating are: about 0.3° C./minute from room temperature to about 300° C., about 0.1° C./minute from about 300° C. to about 400° C., about 0.4° C./minute from about 400° C. to about 600° C., and about 1.5° C./minute from about 600° C. to about 1500° C. Preferred temperature ramps during cooling are: about 2° C./minute from about 1500° C. to about 800° C. and about 1.6° C./minute from about 800° C. to room temperature.

The exact manner in which the "green preforms" are sintered to produce the said ceramic article in this invention is not critical, however, the "shell/surface", as that term is used herein, is limited to those areas of the blank in contact with boron carbide during sintering. It is therefore, imperative that a uniform, unobstructed coating of boron carbide surrounds the "green preforms" to produce an uniformly conductive shell or surface on the blanks.

The articles of the invention are not limited to a particular starting material. As will be shown later, composites of zirconia and alumina can be treated by the methods described above to produce articles having electrically conductive, essentially zirconium boride surface/shell and insulating composite of tetragonal zirconia and α-alumina bulk/core.

Referring to FIG. 1, an electrically conductive $ZrB_2$ outer layer 116 is formed on an otherwise insulating tetragonal zirconia core 114. Sample preparation involved dipping the sintered or "green preform" into a slurry of $B_4C$ and then sintering or heating at 1200°–1600° C. by placing it on an alumina boat within a CM™ tube furnace in an atmosphere of argon gas at a flow rate of 1.0 to 3.0 liters per minute (LPM), preferably 2 LPM. The crystalline structure and electrical conductivity of both shell/surface and the core/bulk for each sintered sample 112 were then determined employing x-ray diffraction techniques and a Veeco 5000 four point probe respectively. A conductive outer layer 116, identified as $ZrB_2$ was detected by x-ray diffraction where the inner core 114 was identified to be predominantly tetragonal $ZrO_2$. Working examples (1 to 2) and comparative examples (1 to 2) illustrate the effect of reacting a sintered ceramic article in contact with $B_4C$ and BN along with the experimental results and are summarized in Table 1. Comparative example 3 illustrates the importance of the sintering atmosphere in this invention.

Working Example 1

Figure 2:
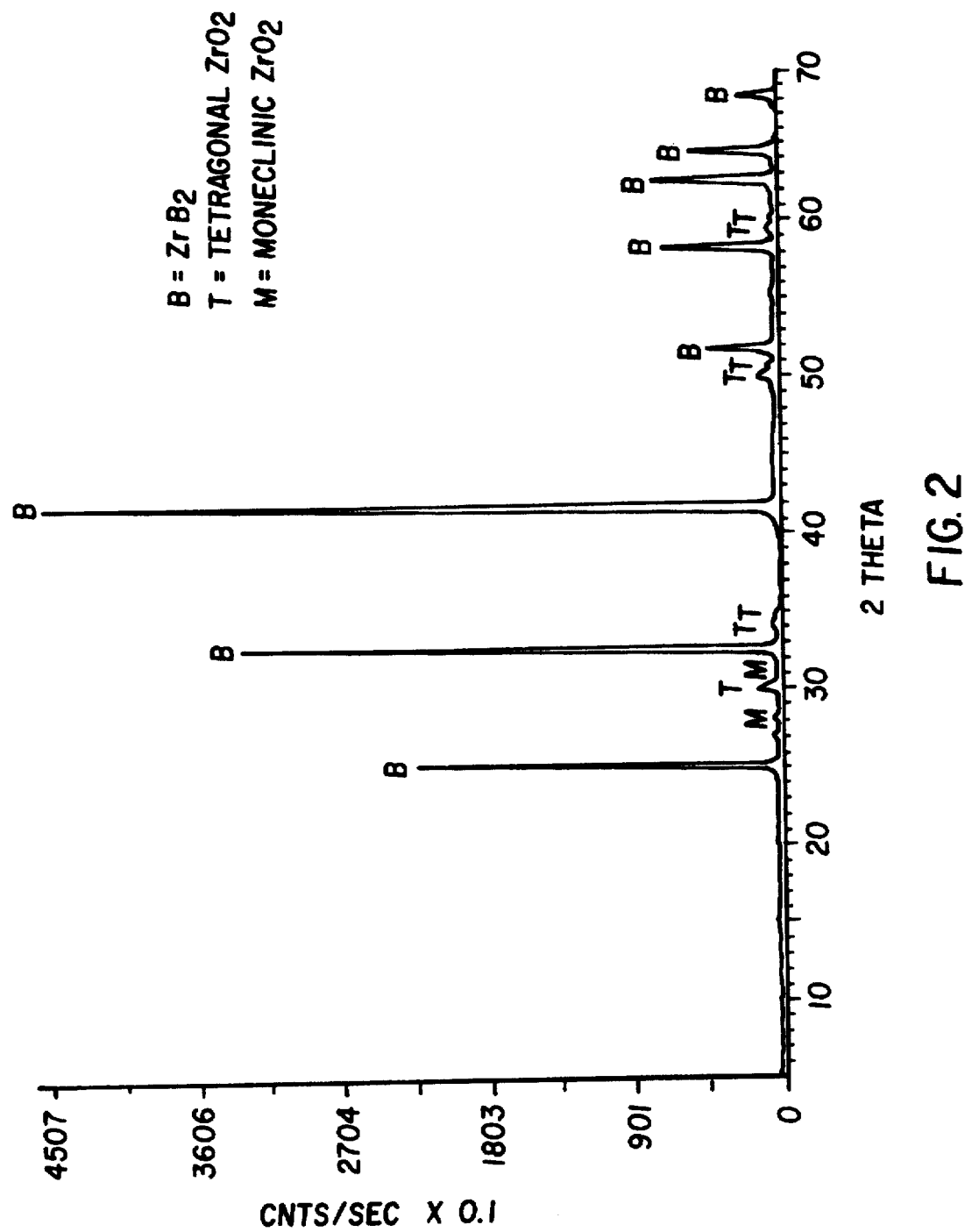
FIG. 2 shows x-ray diffraction data of a tetragonal $ZrO_2$ shell/surface after sintering/reacting with $B_4C$ and showing the presence of predominately $ZrB_2$ phase.
Figure 3:
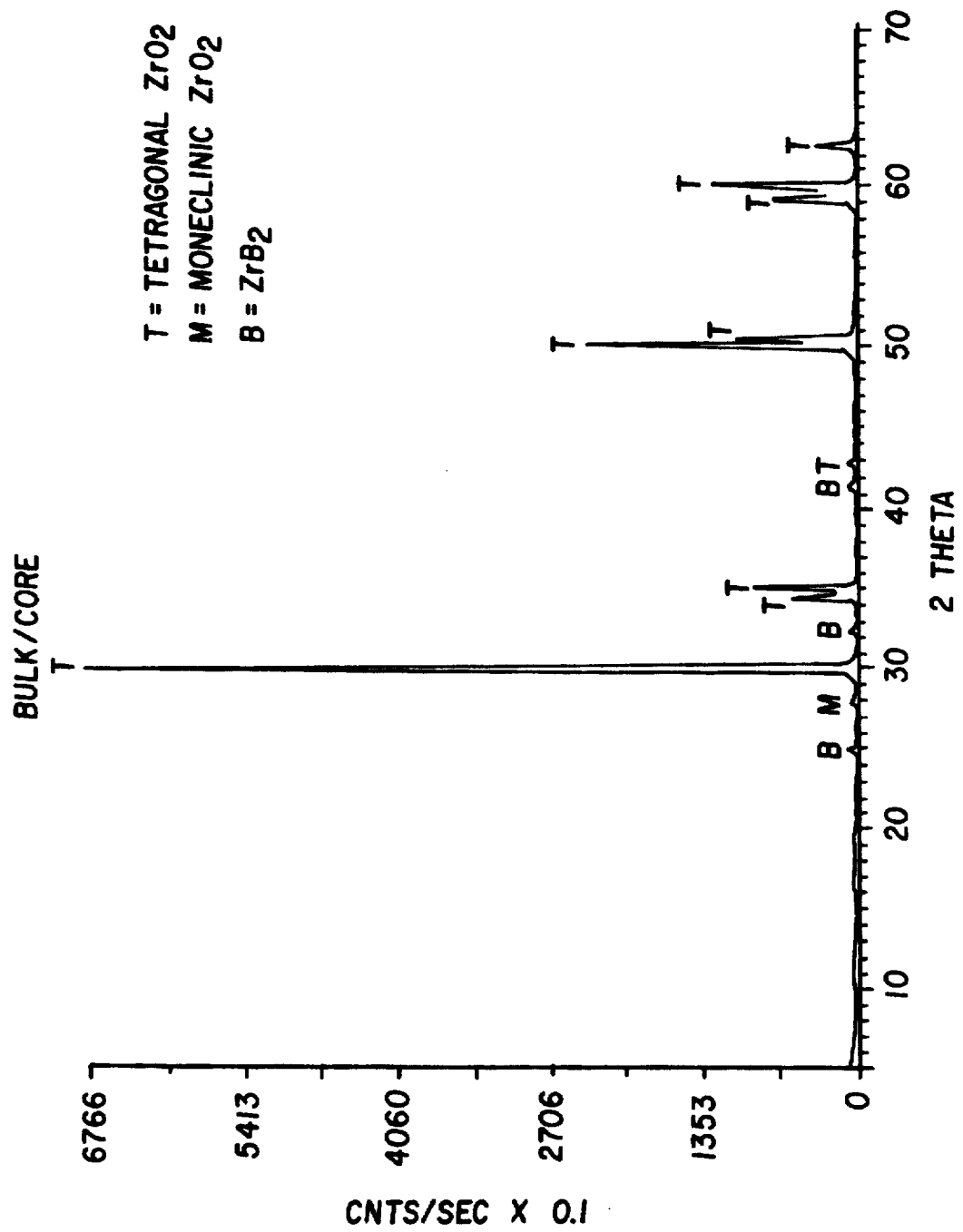
FIG. 3 shows x-ray diffraction data of the core/bulk of a tetragonal $ZrO_2$ article after sintering/reacting with $B_4C$ and shows the presence of predominately tetragonal $ZrO_2$ diffraction peaks.

Green and sintered samples of tetragonal zirconia coated with $B_4C$ were heated to 1200°–1600° C. in an atmosphere of Ar. The x-ray diffraction pattern, FIG. 2, indicates that $ZrB_2$ is the primary phase after heating the coated ceramic article in Ar, with only weak peaks of tetragonal $ZrO_2$ and very weak peaks of monoclinic $ZrO_2$ being observed. While the x-ray diffraction of the core/bulk is illustrated in FIG. 3.

Also, abrasion measurements were taken and the articles with zirconium boride surfaces were tribo-coupled to Y-TZP, WC, and $Al_2O_3$ and determined to have coefficient of friction values of 0.24, 0.25 and 0.28 respectively. This is an improvement over the tribo-couple of Y-TZP against Y-TZP, WC and $Al_2O_3$ which were determined to have coefficient of friction values of 0.29, 0.31 and 0.31 respectively.

Working Example 2

Figure 4:
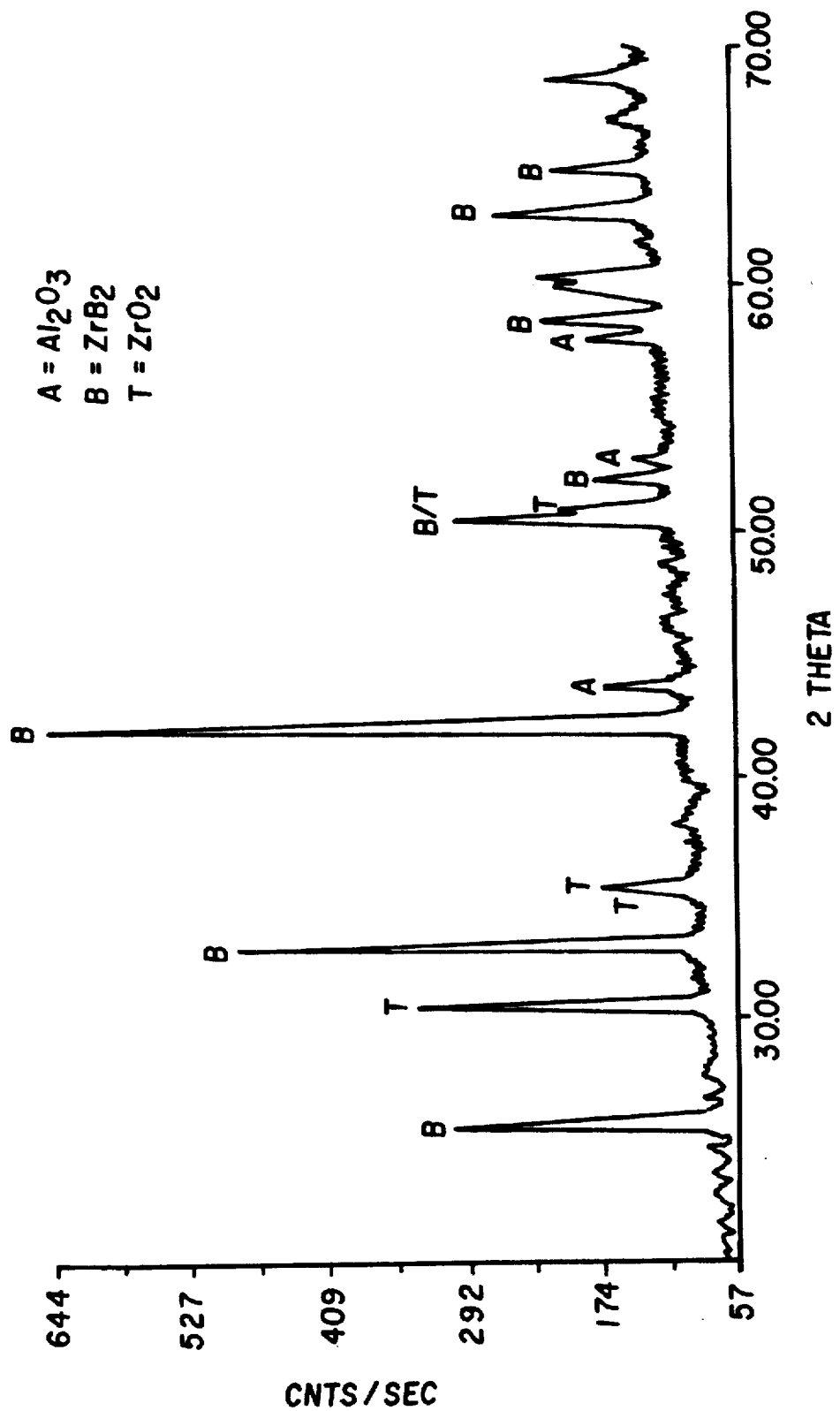
FIG. 4 shows x-ray diffraction data of a Y-TZP and $Al_2O_3$ composite article after sintering/reacting with $B_4C$, showing the major phase in the shell/surface to be $ZrB_2$ with minor tetragonal $ZrO_2$ and $Al_2O_3$.

A $ZrO_2$ and $Al_2O_3$ composite material ($Al_2O_3$ concentration at 40 weight %) was sintered in a similar fashion as described in working example 1. The x-ray diffraction is illustrated in FIG. 4.

Comparative Example 1

Figure 5:
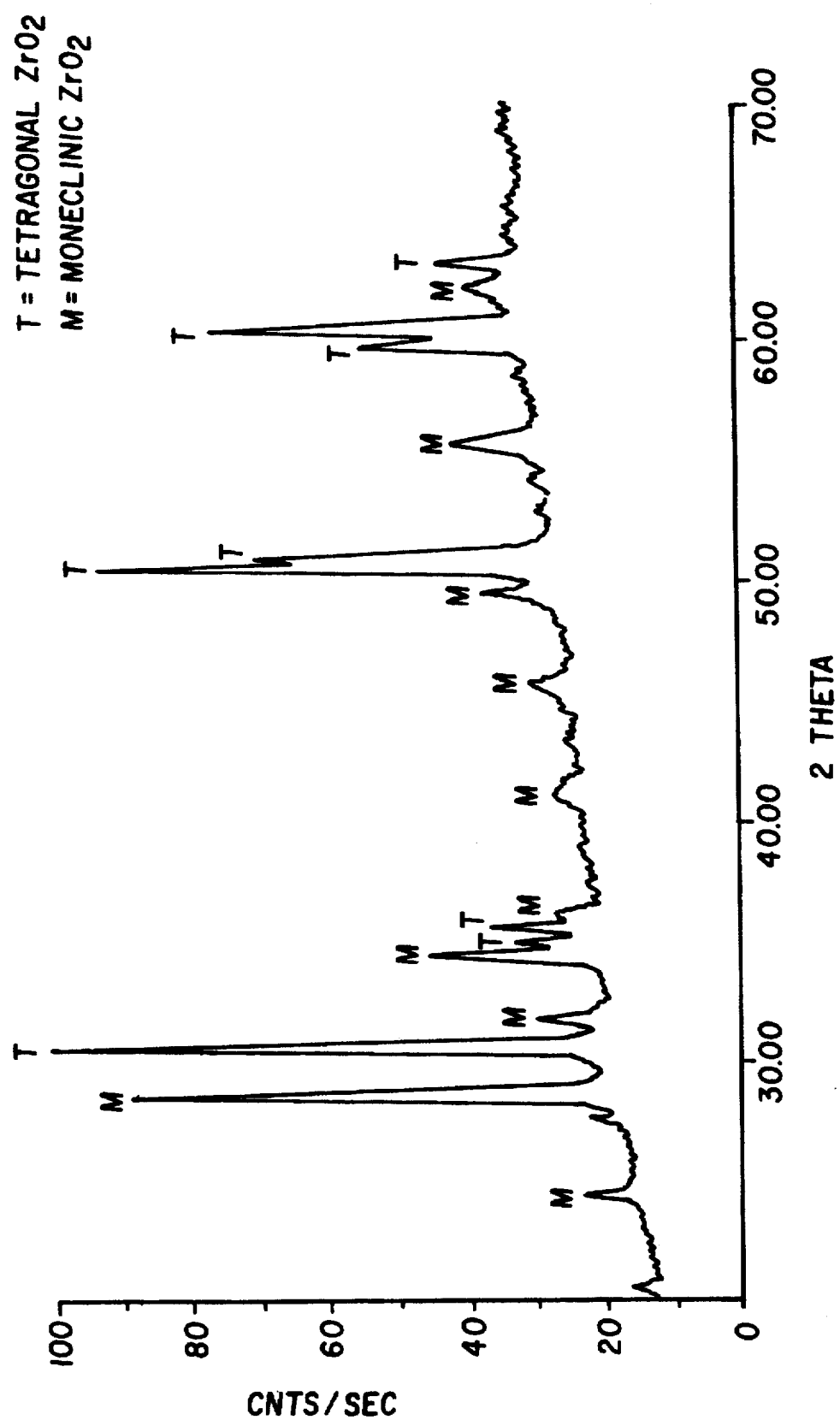
FIG. 5 shows x-ray diffraction data of a tetragonal $ZrO_2$ article after sintering/reacting with BN to yield only insulating tetragonal and monoclinic $ZrO_2$.

BN is in physical contact with the tetragonal zirconia article and sintered in a similar fashion as that of working example 1, not forming conductive $ZrB_2$ emphasizes the importance of $B_4C$ in the present invention. X-ray diffraction of this sample showed strong tetragonal $ZrO_2$ and strong monoclinic $ZrO_2$ peaks as illustrated in FIG. 5 and no electrical conductivity was detected.

Comparative Example 2

A fully sintered $\alpha$-$Al_2O_3$ article was coated with $B_4C$ and sintered as in working example 1. This yielded only $\alpha$-$Al_2O_3$ with no measurable conductivity.

Comparative Example 3

As in working example 1, green and sintered samples of tetragonal zirconia coated with $B_4C$ were treated in similar fashion except sintering was performed in air. The surface/shell of the sintered samples were electrically insulating, emphasizing the importance of argon being the preferred sintering atmosphere.

TABLE 1

| Example | Material | XRD of shell/surface sintered in contact with reactive species | Sheet Resistivity of shell/surface sintered in contact with reactive species, ($\Omega$/sq.) | XRD of core/bulk | Sheet Resistivity of core/bulk, ($\Omega$/sq.) |
| --- | --- | --- | --- | --- | --- |
| Working 1 | Fully sintered tetragonal $ZrO_2$ article with surface coating of $B_4C$ and 1400° C. heated in argon | predominantly $ZrB_2$ (FIG. 2) | 0.0084 | Tetragonal $ZrO_2$ + Very weak $ZrB_2$ (FIG. 3) | Very High |
| Working 2 | Fully sintered tetragonal $ZrO_2$/$Al_2O_3$ composite article with surface coating of $B_4C$ and 1400° C. heated in argon | $ZrB_2$ + tetragonal $ZrO_2$ + $Al_2O_3$ (FIG. 4) | 0.2540 | Tetragonal $ZrO_2$ + $Al_2O_3$ | Very High |
| Comparative 1 | Fully sintered tetragonal $ZrO_2$ article with surface coating of BN and 1400° C. heated in argon | Tetragonal $ZrO_2$ + monoclinic $ZrO_2$ (FIG. 5) | Very High | Tetragonal $ZrO_2$ | Very high |
| Comparative 2 | Fully sintered $Al_2O_3$ article with surface coating $B_4C$ and 1400° C. heated in argon | $\alpha$-$Al_2O_3$ | Very High | $\alpha$-$Al_2O_3$ | Very High |

The methods of the invention are applicable to the production of a variety of articles, particularly cutting tools and abrasion and wear resistant parts, in that many tools have a longer service life if the working surface is a hard cast shell overlying a relatively tougher core. Examples of tools requiring relatively tough cores include slitter knives, punches and dies for cloth, cardboard, metal, polymeric materials and for paper coated with abrasive material such as silver halides and the like, specifically films for advanced photo systems (APS).

The surface electrical conductivity minimizes, if not eliminates, tribo-electric static charge accumulation on the tool surface in an application where moving polymeric materials come in contact with conveyance rollers and guides, for transporting photographic film base or papers. The controlled surface conductivity with the bulk being insulating makes this material useful for an integrated capacitor.

Since the making of $ZrB_2$ is a diffusion controlled process, the thickness of the conductive layer (due to $B_4C$ concentration) can be varied by varying either the sintering temperature and/or sintering time.

As this article process allows for functionally gradient modification, meaning greater depth of the core/bulk can be modified to be electrically conductive, a cost-effective machining method, such as electro-discharge machining (EDM) process can be utilized on these articles to manufacture intricate/complex tools and other objects.

While the invention has been described with particular reference to a preferred embodiment, it will be understood by those skilled in the art that various changes can be made and equivalents may be substituted for elements of the preferred embodiment without departing from the scope of the invention. In addition, many modifications may be made to adapt a particular situation to a teaching of the invention without departing from the essential teachings of the present invention.

We claim:

1. A method for preparing an electrically conductive ceramic article having a core/bulk of tetragonal zirconia alloy and a shell/surface comprising zirconium boride comprising:

i. coating a zirconia or zirconia alloy green body with a boron carbide slurry; and ii. sintering in an argon atmosphere at between 1200° C. to 1600° C.

2. The method of claim 1 wherein the argon gas flow is from 1 to 3 liters per minute.

3. The method of claim 2 wherein the gas flow is 2 liters per minute.

4. The method of claim 1 wherein the core/bulk comprises from 99.9 to 50 weight percent zirconia alloy and from 0.1 to 50 weight percent zirconium boride.

5. The method of claim 1 wherein the zirconia alloy comprises a particulate zirconium oxide alloy having an elemental composition consisting essentially of Zr, O and at least one element selected from the group consisting of oxides of Mg, Ca, Y, Sc, Ce and rare earth elements, said particulate zirconium oxide alloy after sintering has a substantially tetragonal structure.

6. The method of claim 1 wherein the zirconia is doped with from 0.5 to 5 mole percent yttria.

7. The method of claim 1 wherein the zirconia is doped with 3 mole percent yttria.

8. The method of claim 5 wherein the electrically conductive ceramic composite comprises 95 to 50 weight percent zirconia alloy.

9. The method of claim 5 wherein the electrically conductive ceramic composite comprises 5 to 50 weight percent alumina.

10. The method of claim 1 wherein the sintering temperature is 1500° C.

11. The method of claim 1 wherein the sintering time is from 1 to 3 hours.

12. The method of claim 11 wherein the sintering time is 2 hours.

13. The method of claim 1 wherein the sintering temperature is between 1200° C. to 1600° C. and the sintering time is 1 to 3 hours to yield a gradient material with varying zirconium boride concentrations from the end of the shell/surface to the core/bulk of the article.

14. A method for preparing an electrically conductive ceramic article having a core/bulk of tetragonal zirconia alloy and a shell/surface comprising zirconium boride comprising:

i. coating sintered tetragonal zirconia or a zirconia alloy article with boron carbide; and ii. reacting in an argon atmosphere at between 1200° C. to 1600° C.

15. The method of claim 14 wherein the argon gas flow is from 1 to 3 liters per minute.

16. The method of claim 15 wherein the gas flow is 2 liters per minute.

17. The method of claim 14 wherein the core/bulk comprises from 99.9 to 50 weight percent zirconia alloy and from 0.1 to 50 weight percent zirconium boride.

18. The method of claim 14 wherein the zirconia alloy comprises a particulate zirconium oxide alloy having an elemental composition consisting essentially of Zr, O and at least one element selected from the group consisting of oxides of Mg, Ca, Y, Sc, Ce and rare earth elements, said particulate zirconium oxide alloy after sintering has a substantially tetragonal structure.

19. The method of claim 14 wherein the zirconia is doped with from 0.5 to 5 mole percent yttria.

20. The method of claim 14 wherein the zirconia is doped with 3 mole percent yttria.

21. The method of claim 18 wherein the electrically conductive ceramic composite comprises 95 to 50 weight percent zirconia alloy.

22. The method of claim 18 wherein the electrically conductive ceramic composite comprises 5 to 50 weight percent alumina.

23. The method of claim 14 wherein the reaction temperature is 1500° C.

24. The method of claim 14 wherein the reaction time is from 1 to 3 hours.

25. The method of claim 24 wherein the reaction time is 2 hours.

26. The method of claim 14 wherein the reaction temperature is between 1200° C. and 1600° C. and reaction time is 1 to 3 hours to yield a gradient material with varying zirconium boride concentrations from the end of the shell/surface to the core/bulk of the article.

* * * * *